(12) United States Patent
Lee et al.

(10) Patent No.: US 11,505,092 B2
(45) Date of Patent: Nov. 22, 2022

(54) HOLOGRAM SWITCH SYSTEM OF SEAT FOR VEHICLES

(71) Applicants: HYUNDAI MOTOR COMPANY, Seoul (KR); KIA MOTORS CORPORATION, Seoul (KR)

(72) Inventors: Baek Hee Lee, Suwon-si (KR); Gyu Ho Chung, Yongin-si (KR); Jong Hun Lee, Hwaseong-si (KR); Yo Seob Lee, Incheon (KR); Hyun Kyu Park, Hwaseong-si (KR); Min Hyuk Kwak, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 245 days.

(21) Appl. No.: 16/885,690

(22) Filed: May 28, 2020

(65) Prior Publication Data

US 2021/0162888 A1  Jun. 3, 2021

(30) Foreign Application Priority Data

Dec. 2, 2019  (KR) .................. 10-2019-0158007

(51) Int. Cl.
*B60N 2/02* (2006.01)
*B60H 1/00* (2006.01)
*G06F 3/01* (2006.01)
*G06V 40/20* (2022.01)

(52) U.S. Cl.
CPC ....... *B60N 2/0244* (2013.01); *B60H 1/00878* (2013.01); *B60N 2/0232* (2013.01); *G06F 3/017* (2013.01); *G06V 40/28* (2022.01); *B60N 2002/0268* (2013.01); *B60N 2002/0272* (2013.01)

(58) Field of Classification Search
None
See application file for complete search history.

(56) References Cited

U.S. PATENT DOCUMENTS

| 2002/0093565 | A1* | 7/2002 | Watkins | B60N 2/809 348/148 |
| 2007/0171491 | A1 | 7/2007 | Millington | |
| 2010/0107121 | A1* | 4/2010 | Kawachi | B60N 2/0228 715/810 |
| 2011/0012830 | A1 | 1/2011 | Yeh | |

(Continued)

FOREIGN PATENT DOCUMENTS

| JP | 2000-075991 A | 3/2000 |
| JP | 2016-068629 A | 5/2016 |
| KR | 10-2004-0088159 A | 10/2004 |

*Primary Examiner* — Lail A Kleinman
(74) *Attorney, Agent, or Firm* — Morgan, Lewis & Bockius LLP

(57) ABSTRACT

A hologram switch system of a seat for vehicles generates hologram switch images for adjusting movement of the seat and air-conditioning of the seat in front of a passenger sitting on the seat, and allows the passenger to perform selection and operation in the generated hologram switch images through the position and motion of a passenger's hand, so that the passenger may more intuitively approach and easily operate the switch images and thereby easily operate various seat moving apparatuses and seat air-conditioning apparatuses.

10 Claims, 8 Drawing Sheets

(56) References Cited

U.S. PATENT DOCUMENTS

| | | | |
|---|---|---|---|
| 2011/0031796 A1* | 2/2011 | Hong | B60N 2/829 |
| | | | 297/410 |
| 2016/0170482 A1* | 6/2016 | Yajima | G06F 3/013 |
| | | | 345/8 |
| 2019/0302895 A1* | 10/2019 | Jiang | G06F 3/016 |
| 2020/0223341 A1* | 7/2020 | Boesl | B60R 11/0235 |
| 2020/0290513 A1* | 9/2020 | Karafin | G06F 3/013 |
| 2021/0001785 A1* | 1/2021 | Rose | B60W 40/08 |

* cited by examiner

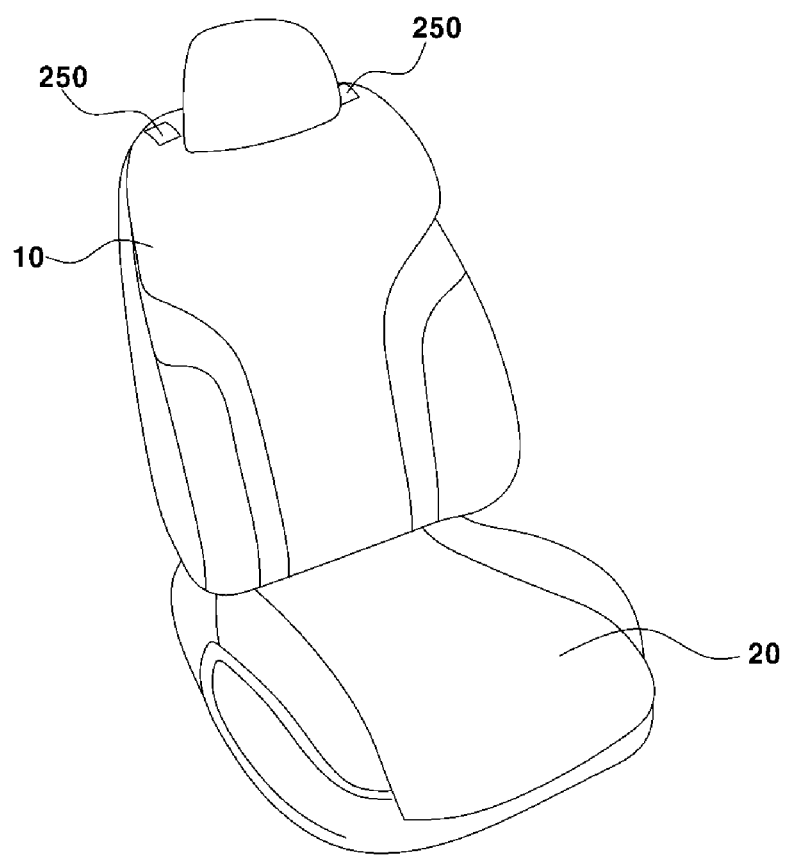

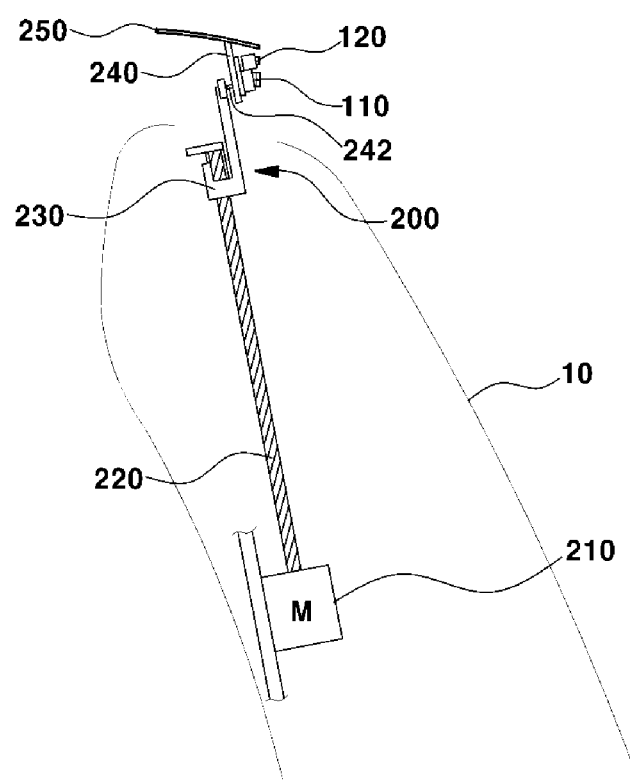

HOLOGRAM SWITCH SYSTEM OF SEAT FOR VEHICLES

CROSS-REFERENCE TO RELATED APPLICATION

The present application claims the benefit of priority to Korean Patent Application No. 10-2019-0158007 filed on Dec. 2, 2019 in the Korean Intellectual Property Office, the entire disclosure of which is incorporated herein by reference.

TECHNICAL FIELD

The present disclosure relates to a hologram switch system of a seat for vehicles. More particularly, it relates to a hologram switch system of a seat for vehicles which allows a passenger sitting on the seat to operate a hologram switch projected in front of the passenger so as to adjust the movement and posture of the seat.

BACKGROUND

In general, a seat for vehicles includes a seat cushion configured to allow a passenger to sit thereon, a seat back configured to support the passenger's back, and a headrest configured to support the passenger's neck and head, and various seat posture adjustment apparatuses and convenience apparatuses are installed inside and outside such a seat.

Among the seat posture adjustment apparatuses and the convenience apparatuses, apparatuses relating to adjustment of movement of the seat may include a seat forward and backward position adjustment apparatus, a seat back reclining apparatus, a seat cushion tilting apparatus, a seat height adjustment apparatus, an extension apparatus for extending the front end of a seat cushion, a lumbar support apparatus, a shoulder adjustment apparatus, etc., and apparatuses relating to adjustment of air-conditioning of the seat may include a ventilation apparatus, a heating wire apparatus, etc.

Generally, a switch for adjusting movement of the seat and a switch for adjusting air-conditioning of the seat are mounted in a designated arrangement on a shield cover mounted on the seat cushion, are mounted in a designated arrangement on an armrest, or are mounted in a designated arrangement at a front portion of a console box.

However, as the kinds and number of seat posture adjustment apparatuses and convenience apparatuses applied to the seat are increased, the kind and number of switches for adjusting movement of the seat and air-conditioning of the seat so as to operate these apparatuses are increased, and thus a passenger has difficulty in selecting and operating a desired switch.

Further, since a mechanism which simultaneously adjusts rotation of a seat in a desired direction and movement of the seat to a desired position may be applied to an independent seat of an autonomous vehicle, if switches for adjusting movement of the seat and air-conditioning of the seat are arranged at a position other than the seat, a passenger cannot operate these switches.

Therefore, direct approach to and easy operation of switches for adjusting movement of seats and air-conditioning of seats are required.

The information disclosed in the Background section above is to aid in the understanding of the background of the present disclosure, and should not be taken as acknowledgement that this information forms any part of prior art.

SUMMARY

The present disclosure has been made in an effort to solve the above-described problems associated with the prior art and it is an object of the present disclosure to provide a hologram switch system of a seat for vehicles which generates hologram switch images for adjusting movement of the seat and adjusting air-conditioning of the seat in front of a passenger sitting on the seat and allows the passenger to perform selection and operation in the generated hologram switch images through the position and motion of a passenger's hand so that the passenger may more intuitively approach and easily operate the switch images and thereby easily operate seat moving apparatuses and seat air-conditioning apparatuses.

In one aspect, the present disclosure provides a hologram switch system of a seat for vehicles. The hologram switch system may include one or more hologram image reproducers mounted on an upper end of a seat back so as to be received therein and withdrawn therefrom and configured to generate hologram images for adjusting the seat in front of a user, one or more cameras mounted on the upper end of the seat back so as to be received therein and withdrawn therefrom and configured to recognize a position and motion of a user's hand with respect to the hologram images for adjusting the seat, generated in front of the user, as a seat adjustment switching signal, an input device configured to input an operation start signal of the one or more hologram image reproducers and the one or more cameras, and a controller configured to apply an operation signal to the one or more hologram image reproducers and the one or more cameras in response to the operation start signal input through the input device and to apply a drive control signal to at least one of seat moving apparatuses or seat air-conditioning apparatuses corresponding to the seat adjustment switching signal from the one or more cameras.

In a preferred embodiment, each of the one or more hologram image reproducers and a corresponding one of the one or more cameras may be defined as one hologram module, and hologram modules may be respectively mounted on elevating apparatuses mounted in the seat back so as to be received therein and withdrawn therefrom.

In another preferred embodiment, each of the hologram modules may include a first hologram module mounted on an upper left end of the seat back so as to be received therein and withdrawn therefrom and configured to generate a hologram image for adjusting movement of the seat, and a second hologram module mounted on an upper right end of the seat back so as to be received therein and withdrawn therefrom and configured to generate a hologram image for adjusting air-conditioning of the seat.

In still another preferred embodiment, the hologram image for adjusting movement of the seat may be generated by combining respective arrow switch marks for operating a seat forward and backward position adjustment apparatus, a seat back reclining apparatus, a seat cushion tilting apparatus, a seat height adjustment apparatus, a seat cushion extension apparatus, a lumbar support apparatus, a shoulder adjustment apparatus and a headrest position adjustment apparatus with a seat image.

In yet another preferred embodiment, the hologram image for adjusting air-conditioning of the seat may be generated by combining a first block mark for adjusting a level of a ventilation apparatus and a second block mark for adjusting a level of a heating wire apparatus, the first and second block marks appearing in different colors.

In still yet another preferred embodiment, each of the elevating apparatuses may include a motor mounted at a designated position of a seat back frame of the seat back and configured to be driven by a control signal from the controller, a lead screw connected to a rotating shaft of the motor, an elevating bracket coupled to the lead screw and configured to be raiseable and lowerable, and a support bracket having a front surface portion on which a respective hologram image reproducer and a respective camera are fixedly mounted and a rear surface portion coupled to the elevating bracket.

In a further preferred embodiment, the rear surface portion of the support bracket may be coupled to the elevating bracket by a ball joint configured to adjust an angle of the elevating bracket in upward and downward directions and in leftward and rightward directions.

In another further preferred embodiment, each of the elevating apparatuses may further include a cover configured to cover an opening defined in the seat back, and the cover may be disposed above the respective camera.

In still another further preferred embodiment, the input device may include a voice recognizer configured to recognize a user's voice command and to transmit the operation start signal to the controller.

In yet another further preferred embodiment, the input device may include a smart device configured to transmit the operation start signal to the controller.

In still yet another further preferred embodiment, each of the one or more cameras may include a wide angle camera configured to magnify a range of sensing the position and motion of the user's hand.

Other aspects and preferred embodiments of the present disclosure are discussed infra.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not imitative of the present disclosure, and wherein:

FIGS. 1A and 1B are perspective views illustrating a lowered (received) state and a raised (withdrawn) state of hologram modules in the configuration of a hologram switch system of a seat for vehicles according to an exemplary embodiment of the present disclosure;

FIGS. 8A and 8B are cross-sectional views illustrating the hologram module according to some exemplary embodiments of the present disclosure, which is installed in a seat back so as to be raised and lowered by an elevating apparatus.

Figure 1B:
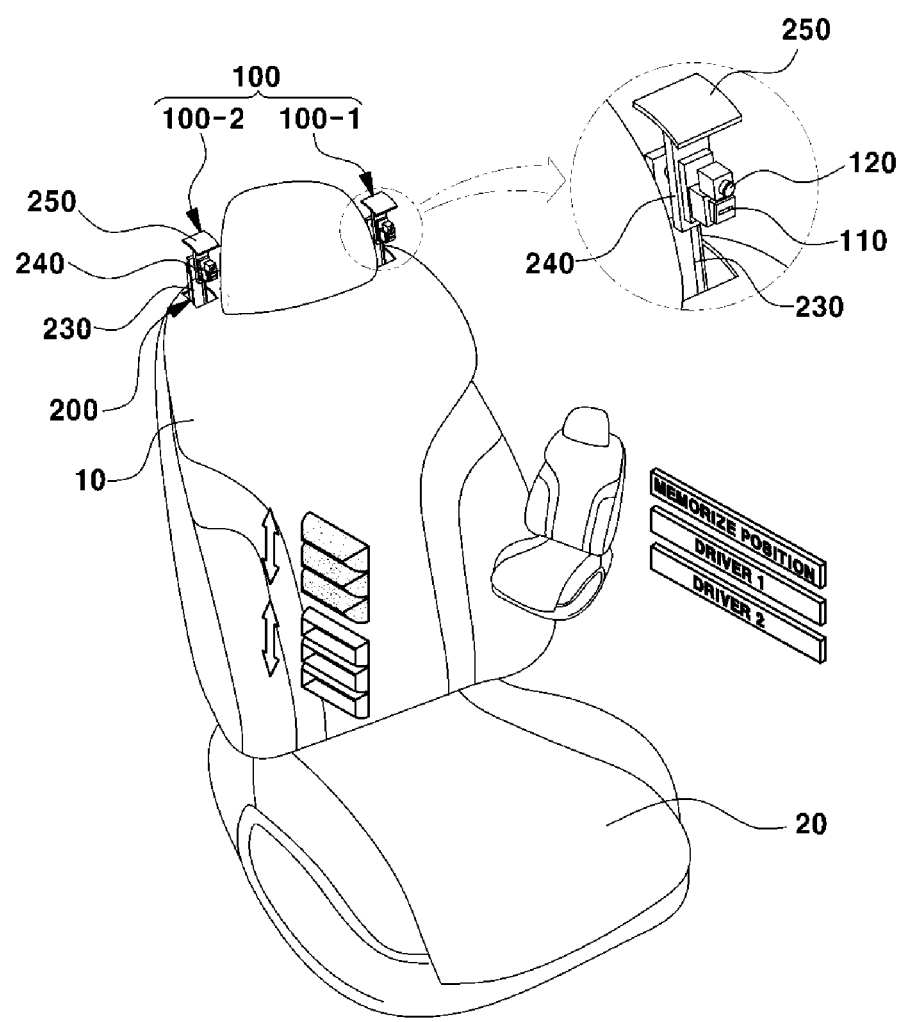

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the present disclosure is intended to cover not only the exemplary embodiments, but also various alternatives, modifications, equivalents and other embodiments within the spirit and scope of the present disclosure as defined by the appended claims.

Figure 2:
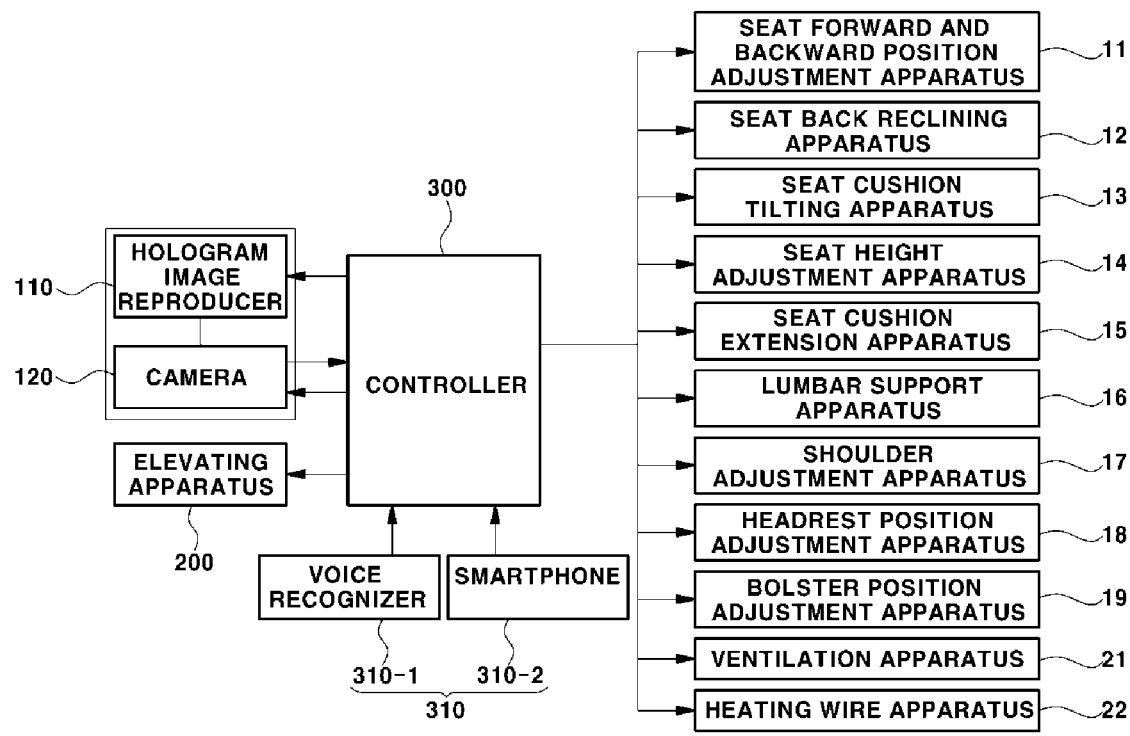
FIG. 2 is a control block diagram illustrating the hologram switch system according to an exemplary embodiment of the present disclosure.

FIGS. 1A and 1B are perspective views illustrating a lowered (received) state and a raised (withdrawn) state of hologram modules in the configuration of a hologram switch system of a seat for vehicles according to an exemplary embodiment of the present disclosure, and FIG. 2 is a control block diagram illustrating the hologram switch system according to an exemplary embodiment of the present disclosure. Here, reference numeral 100 indicates the hologram modules.

Each hologram module 100 is one module including a hologram image reproducer 110 and a camera 120, and may be configured to be lowered so as to be received inside a seat back 10 or to be raised so as to be withdrawn outside the seat back 10 by an elevating apparatus 200 mounted in the seat back 10.

Particularly, each of the hologram modules 100 may include a first hologram module 100-1 mounted on the upper left end of the seat back 10 so as to be received therein and withdrawn therefrom and configured to generate a hologram image for adjusting movement of the seat, and a second hologram module 100-2 mounted on the upper right end of the seat back 10 so as to be received therein and withdrawn therefrom and configured to generate a hologram image for adjusting air-conditioning of the seat.

Here, each of the first hologram module 100-1 and the second hologram module 100-2 is formed as one module including the hologram image reproducer 110 and the camera 120. The first hologram module 100-1 and the second hologram module 100-2 are different in that the first hologram module 100-1 generates the hologram image for adjusting movement of the seat and the second hologram module 100-2 generates the hologram image for adjusting air-conditioning of the seat.

The hologram image reproducer 110 and the camera 120 are mounted in an upper end of the seat back 10 so as to be received therein and withdrawn therefrom by the elevating apparatus 200. The hologram image reproducer 110 generates a hologram image for adjusting the seat in front of a user (a passenger sitting on the seat) in response to an operating command signal from a controller 300.

Particularly, the hologram image reproducer 110 reproduces a desired 3-D image using a principle that records and reproduces an interference signal acquired by overlapping light reflected by an object (an object wave) and light having coherence (a reference wave).

The camera 120 and the hologram image reproducer 110 are mounted on the upper end of the seat back 10 so as to be received therein and withdrawn therefrom. The camera 120 recognizes the position and motion of a user's hand with respect to the hologram image for adjusting the seat generated in front of the user as a seat adjustment switching signal, and transmits the seat adjustment switching signal to the controller 300.

Particularly, the camera 120 may employ a wide angle camera which may magnify the range of sensing of the position and motion of a passenger's hand.

The hologram image reproducer 110 and the camera 120 may be operated by user input operation through an input device 310 and a command signal from the controller 300.

That is, the hologram image reproducer 110 and the camera 120 may start to be operated through a process of inputting an operation start command through the input device 310 by the user, a process of transmitting an input signal from the input device 310 to the controller 300, and a process of applying current for operation to the hologram image reproducer 110 and the camera 120 by the controller 300.

For this purpose, the input device 310 may employ a voice recognizer 310-1 which recognizes a user's voice command (for example, "turn on the hologram for adjusting the seat") and transmits an operation start command signal to the controller 300.

Alternatively, the input device 310 may employ a smart device 310-2 possessed by the user, and when the user inputs a command to project the hologram for adjusting the seat through an application of the smart device 310-2, the smart device 310-2 may transmit an operation start command signal to the controller 300.

When the operation start command signal is transmitted to the controller 300 using the input device 310, the controller 300 commands the elevating apparatuses 200 to withdraw the hologram image reproducers 110 and the cameras 120 outwards before applying current for operation to the hologram image reproducers 110 and the cameras 120.

Figure 8A:
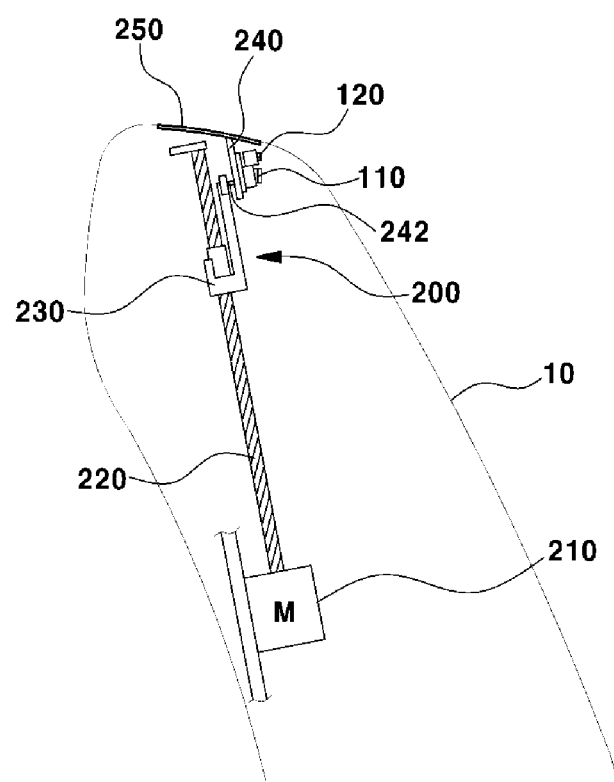

The elevating apparatus 200 includes, as shown in FIGS. 8A and 8B showing an exemplary embodiment of the present disclosure, a motor 210 which is mounted on a seat back frame in the seat back 10 so as to be driven by a control signal from the controller 300, a lead screw 220 which is connected to a rotating shaft of the motor 210 so as to idle, an elevating bracket 230 which is coupled to the lead screw 220 so as to be raiseable and lowerable, and a support bracket 240 which is coupled to the elevating bracket 230 such that the hologram image reproducer 110 and the camera 120 are mounted on the support bracket 240.

Here, the camera 120 and the hologram image reproducer 110 are located at upper and lower regions of the front surface portion of the support bracket 240 so as to be fixedly mounted thereon, and the elevating bracket 230 is coupled to the rear surface portion of the support bracket 240.

Particularly, the rear surface portion of the support bracket 240 is coupled to the elevating bracket 230 by a ball joint 242 so as to adjust the angle of the camera 120 and the hologram image reproducer 110 in the upward and downward directions and the leftward and rightward directions.

Further, a cover 250 which covers an opening formed in the upper end of the seat back 10 is provided above the camera 120, and the cover 250 is located to cover the opening formed in the upper end of the seat back 10 when the camera 120 and the hologram image reproducer 110 are lowered and received in the seat back 10, as shown in FIGS. 1A and 8A.

The controller 300 is configured to simultaneously apply a drive signal to the motors 210 of the elevating apparatuses 200 and apply an operation signal to the hologram image reproducers 110 and the cameras 120 in response to the input signal from the input device 310, and then to apply a drive control signal to one or more of the seat moving apparatuses and the seat air-conditioning apparatuses corresponding to seat adjustment switching signals from the cameras 120.

Here, the seat moving apparatuses driven by the controller 300 may include motor-driven apparatuses, such as a seat forward and backward position adjustment apparatus 11, a seat back reclining apparatus 12, a seat cushion tilting apparatus 13, a seat height adjustment apparatus 14, a seat cushion extension apparatus 15, a lumbar support apparatus 16, a shoulder adjustment apparatus 17, a headrest position adjustment apparatus 18, a bolster position adjustment apparatus 19, etc., and may further include other motor-driven apparatuses for adjusting the seat.

Further, the seat air-conditioning apparatuses driven by the controller 300 may include a ventilation apparatus 21 for discharging cold air, and a heating wire apparatus 22 for heating the seat.

Hereinafter, a process of operating the hologram switch system having the above-described configuration according to an exemplary embodiment of the present disclosure will be described.

Figure 3:
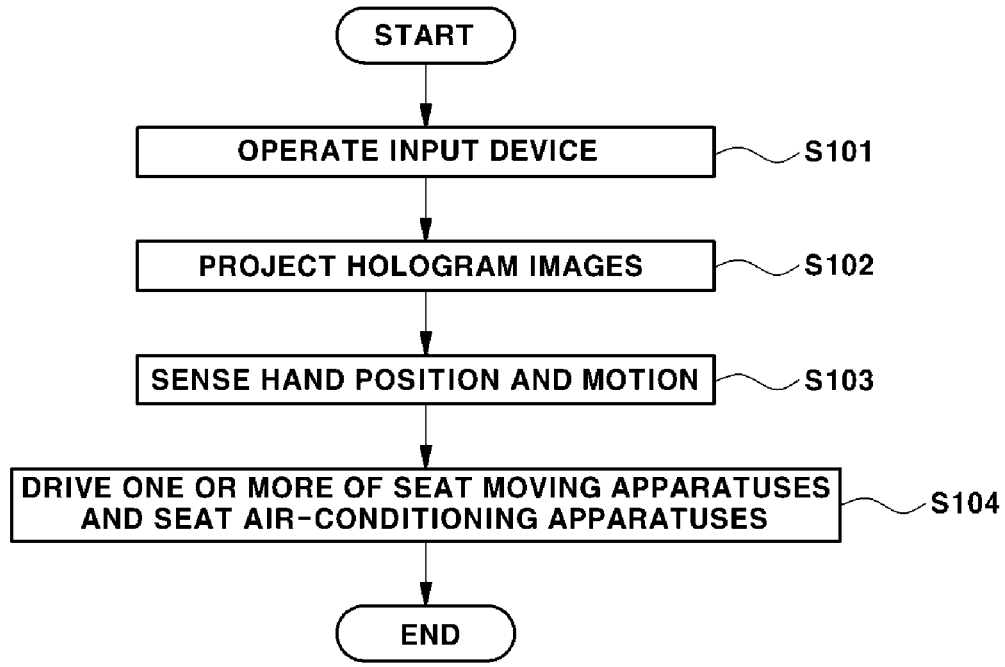
FIG. 3 is a flowchart representing a process of operating the hologram switch system according to an exemplary embodiment of the present disclosure.

FIG. 3 is a flowchart representing the process of operating the hologram switch system according to an exemplary embodiment of the present disclosure.

First, a user (a passenger sitting on the seat) inputs a command to generate the hologram for adjusting the seat using the input device 310 (S101).

For example, when the user issues a voice command (for example, "turn on the hologram for adjusting the seat"), the voice recognizer 310-1 may recognize the user voice command and transmit an operation start command signal to the controller 300.

Alternatively, when the user inputs a command to project the hologram for adjusting the seat through an application of the smart device 310-2, the smart device 310-2 may transmit an operation start command signal to the controller 300.

Thereafter, the controller 300 commands the elevating apparatuses 200 to withdraw the hologram image reproducers 110 and the cameras 120 outwards.

Therefore, when the motors 210 of the elevating apparatuses 200 are driven and simultaneously the lead screws 220 idle, the elevating brackets 230 coupled to the lead screws 220 so as to be raiseable and lowerable are raised, and simultaneously, the support brackets 240 coupled to the elevating brackets 230 are raised, and thus, the hologram image reproducers 110 and the cameras 120 mounted on the support brackets 240 are raised upwards from the upper end of the seat back 10, as shown in FIGS. 1B and 8B.

Thereafter, when the controller 300 applies current for operation to the hologram image reproducers 110 and the cameras 120, the hologram image reproducers 110 reproduce hologram images in front of the user (S102), and the cameras 120 start to sense the position and motion of user fingers (S103).

For example, a hologram image 30 for adjusting movement of the seat, which is generated by the hologram image reproducer 110 of the first hologram module 100-1, may be an image generated by combining a plurality of arrow switch marks 30-2 for operating the seat forward and backward position adjustment apparatus, the seat back reclining apparatus, the seat cushion tilting apparatus, the seat height adjustment apparatus, the seat cushion extension apparatus, the lumbar support apparatus, the shoulder adjustment apparatus and the headrest position adjustment apparatus with a seat image 30-1.

Further, a hologram image 31 for adjusting air-conditioning of the seat, which is generated by the hologram image reproducer 110 of the second hologram module 100-2, may be an image generated by combining a block mark 31-1 for adjusting the level of the ventilation apparatus, which appears in blue, and a block mark 31-2 for adjusting the level of the heating wire apparatus 22, which appears in red.

Thereafter, the user makes a motion of putting his/her fingers to a desired adjustment region of the hologram image 30 for adjusting movement of the seat, or a motion of putting his/her fingers to the hologram image 31 for adjusting air-conditioning of the seat.

Here, the cameras 120, which are configured to sense the position and motion of the user fingers, sense an adjustment region of the hologram image 30 for adjusting movement of the seat or an adjustment region of the hologram image 31 for adjusting air-conditioning of the seat to which the user puts his/her fingers for a designated time using a seat adjustment switching signal, and transmit the sensed signal to the controller 300.

Thereafter, the controller 300 may apply a drive control signal to one or more of the seat moving apparatuses and the seat air-conditioning apparatuses corresponding to the seat adjustment switching signal from the cameras 120, and thereby, the one or more of the seat moving apparatuses and the seat air-conditioning apparatuses, which are desired by the user, may be driven (S104).

Hereafter, one example of generation of the hologram image 30 for adjusting movement of the seat or the hologram image 31 for adjusting air-conditioning of the seat by the hologram image reproducer 110 and one example of sensing the position and motion of the user fingers by the camera 120 will be described.

Figure 4:
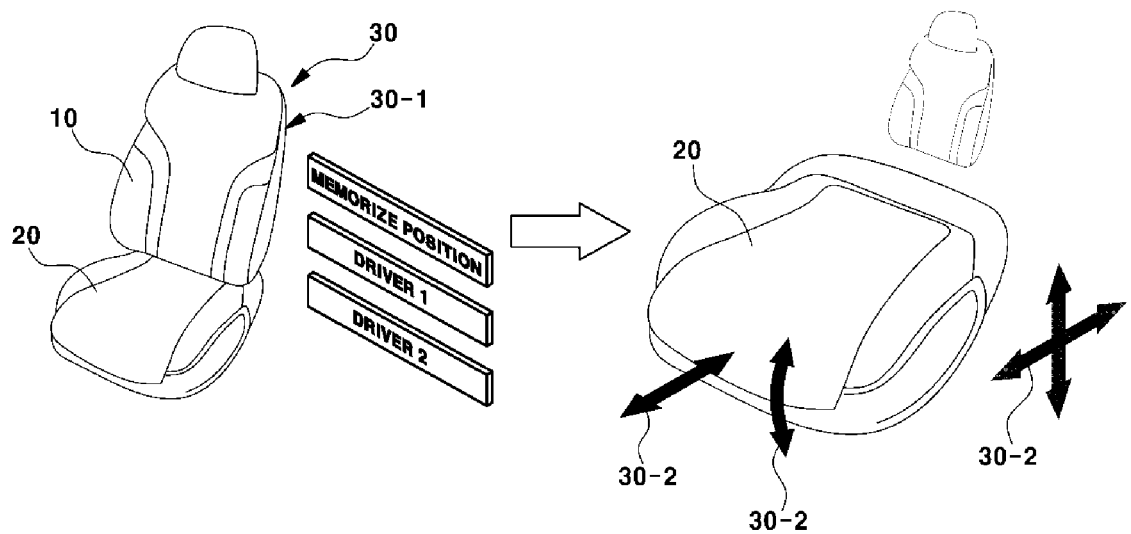
FIGS. 4 and 5 are schematic views illustrating operation of the hologram switch system according to some exemplary embodiments of the present disclosure so as to operate seat moving apparatuses, as one example of operation of the hologram switch system.
Figure 5:
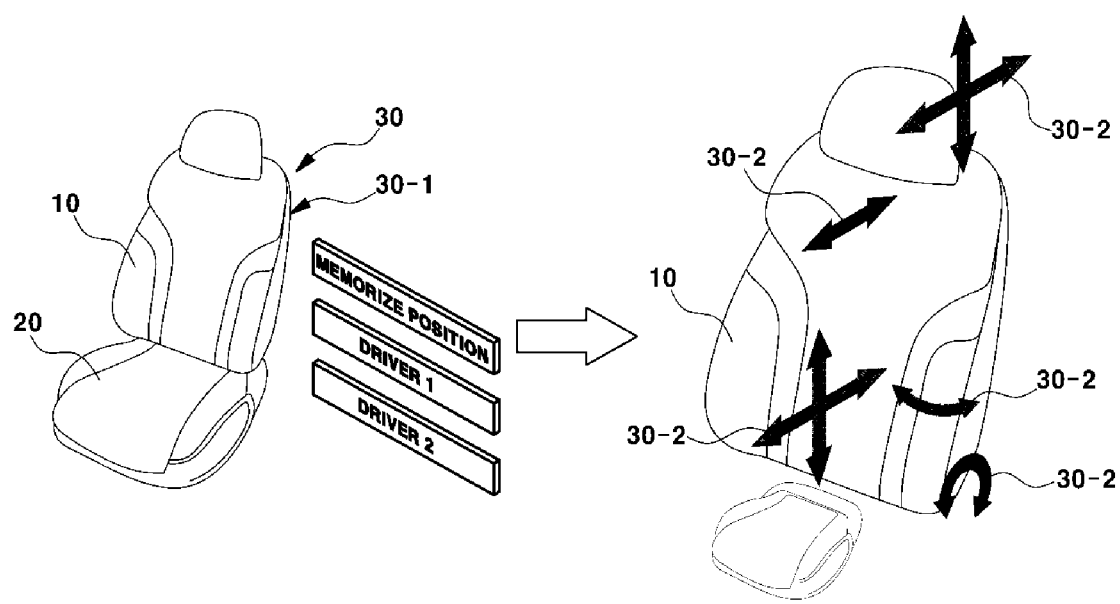

FIGS. 4 and 5 are schematic views illustrating operation of the hologram switch system according to some exemplary embodiments of the present disclosure so as to operate the seat moving apparatuses, as one example of operation of the hologram switch system.

After generation of the hologram image 30 for adjusting movement of the seat by the hologram image reproducer 110, when the user locates his/her fingers at a seat cushion 20 in the seat image 30-1 of the hologram image 30 for adjusting movement of the seat for a designated time (for example, 0.5-1.0 seconds), the camera 120 senses a finger position signal and transmits the sensed finger position signal to the controller 300, the controller 300 applies a continuous reproduction signal to the hologram image reproducer 110, and thus the hologram image reproducer 110 displays an enlarged image of the seat cushion 20 in the seat image 30-1, as shown in FIG. 4.

Here, when the enlarged image of the seat cushion 20 is displayed, as shown in FIG. 4, a cross-shaped arrow switch mark 30-2 for adjusting the forward and backward movement of the seat and adjusting the height of the seat and bidirectional arrow switch marks 30-2 for adjusting tilting of the seat cushion 20 and adjusting the extension of the seat cushion 20 are displayed together.

Thereafter, when the user touches the cross-shaped arrow switch mark 30-2 for adjusting the forward and backward movement of the seat and adjusting the height of the seat or the bidirectional arrow switch marks 30-2 for adjusting tilting of the seat cushion 20 and adjusting the extension of the seat cushion 20 with his/her fingers and makes a motion in a desired direction, the camera 120 senses a finger motion signal and transmits the sensed finger motion signal to the controller 300.

Subsequently, the controller 300 may apply current for driving to one or more of a motor included in the seat forward and backward position adjustment apparatus 11, a motor included in the cushion tilting apparatus 13, a motor included in the seat height adjustment apparatus 14 and a motor included in the seat cushion extension apparatus 15, as a seat moving apparatus corresponding to the user finger motion signal, and thus drive the seat moving apparatus related to the seat cushion 20 desired by the user, and in this case, a driving amount may be increased or decreased in proportion to a time for which the user finger motion signal is output.

On the other hand, after generation of the hologram image 30 for adjusting movement of the seat by the hologram image reproducer 110, when the user locates his/her fingers at a seat back 10 in the seat image 30-1 of the hologram image 30 for adjusting movement of the seat for a designated time (for example, 0.5-1.0 seconds), the camera 120 senses a finger position signal and transmits the sensed finger position signal to the controller 300, and the controller 300 applies a continuous reproduction signal to the hologram image reproducer 110, and thus the hologram image reproducer 110 displays an enlarged image of the seat back 10 in the seat image 30-1, as shown in FIG. 5.

Here, when the enlarged image of the seat back 10 is displayed, as shown in FIG. 5, curved arrow switch marks 30-2 for adjusting reclining of the seat back 10 and adjusting the positions of the bolsters 14, cross-shaped arrow switch marks 30-2 for adjusting the lumbar support and adjusting the position of the headrest 16, and a bidirectional arrow switch mark 30-2 for adjusting shoulder supports are displayed together.

Thereafter, when the user touches one or more of the curved arrow switch marks 30-2 for adjusting reclining of the seat back 10 and adjusting the positions of the bolsters 14, the cross-shaped arrow switch marks 30-2 for adjusting the lumbar support and adjusting the position of the headrest 16, and the bidirectional arrow switch mark 30-2 for adjusting the shoulder supports of the seat with the fingers and makes a motion in a desired direction, the camera 120 senses a finger motion signal and transmits the sensed finger motion signal to the controller 300.

Subsequently, the controller 300 may apply current for driving to one or more of a motor included in the seat back reclining apparatus 12, a motor included in the lumbar support apparatus 16, a motor included in the shoulder adjustment apparatus 17, a motor included in the headrest position adjustment apparatus 18 and a motor included in the bolster position adjustment apparatus 19, as a seat moving apparatus corresponding to the user finger motion signal, and thus drive the seat moving apparatus related to the seat back 10 desired by the user, and in this case, a driving amount may be increased or decreased in proportion to a time for which the user finger motion signal is output.

Figure 6:
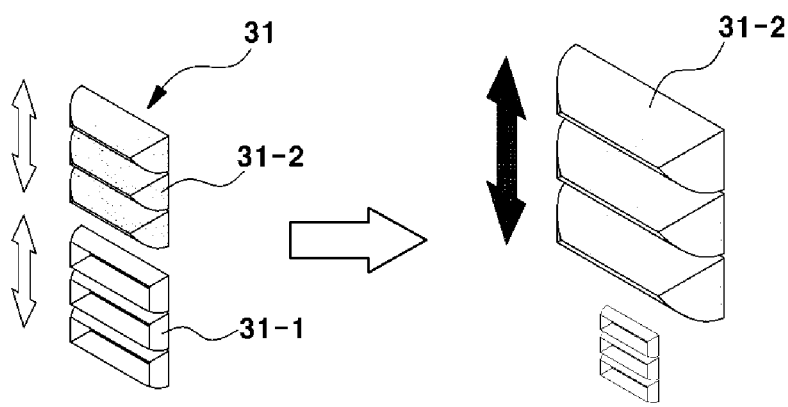
FIGS. 6 and 7 are schematic views illustrating operation of the hologram switch system according to some exemplary embodiments of the present disclosure so as to operate seat air-conditioning apparatuses, as another example of operation of the hologram switch system.
Figure 7:
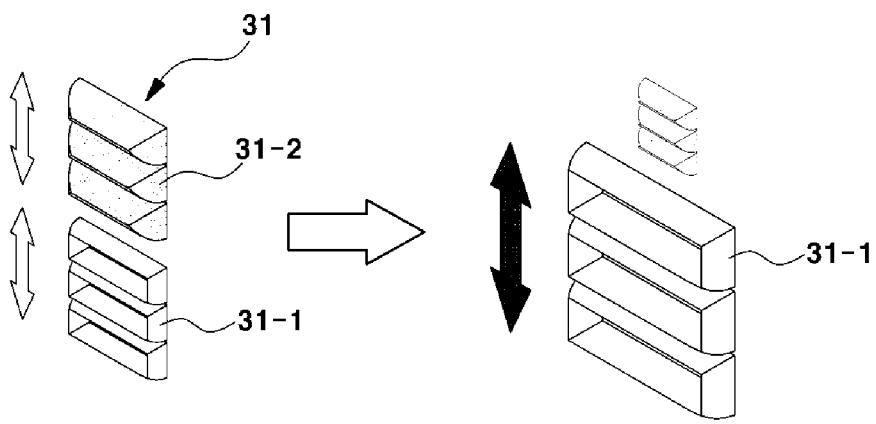

FIGS. 6 and 7 are schematic views illustrating operation of the hologram switch system according to some exemplary embodiments of the present disclosure so as to operate the seat air-conditioning apparatuses, as another example of operation of the hologram switch system.

After generation of the hologram image 31 for adjusting air-conditioning of the seat by the hologram image reproducer 110, when the user touches the block mark 31-2 for adjusting the level of the heating wire apparatus 22, which appears in red, and makes a motion upwards or downwards, the camera 120 senses a finger motion signal and transmits the sensed finger motion signal to the controller 300.

Subsequently, the controller 300 may apply a current signal for driving the heating wire apparatus 22 and adjusting the level of the heating wire apparatus 22 corresponding to the user finger motion signal, to the heating wire apparatus 22, thus driving the heating wire apparatus 22 so as to heat the seat.

On the other hand, after generation of the hologram image 31 for adjusting air-conditioning of the seat by the hologram image reproducer 110, when the user touches the block mark 31-1 for adjusting the level of the ventilation apparatus 21, which appears in blue, and makes a motion upwards or downwards, the camera 120 senses a finger motion signal and transmits the sensed finger motion signal to the controller 300.

Subsequently, the controller 300 may apply a current signal for driving the ventilation apparatus 21 and adjusting the level of the ventilation apparatus 21, corresponding to the user finger motion signal, to the ventilation apparatus 21, thus driving the ventilation apparatus 21 so as to discharge cold air through the seat.

The user (the passenger sitting on the seat) may give a command to stop generation of the hologram for adjusting the seat using the input device 310.

For example, when the user issues a voice command (for example, "turn off the hologram for adjusting the seat"), the voice recognizer 310-1 may recognize the user voice command and transmit an operation stop command signal to the controller 300.

Alternatively, when the user inputs a command to stop projection of the hologram for adjusting the seat through an application of the smart device 310-2, the smart device 310-2 may transmit an operation stop command signal to the controller 300.

Thereafter, the controller 300 stops application of current to the hologram image reproducers 110 and the cameras 120, and applies a reverse drive signal to the motors 210 of the elevating apparatuses 200.

Accordingly, when the motors 210 of the elevating apparatuses 200 are driven in reverse and the lead screws 220 idle in the reverse direction, the elevating brackets 230 coupled to the lead screws 220 so as to be raiseable and lowerable are lowered, and simultaneously, the support brackets 240 coupled to the elevating brackets 230 are lowered, and thus, the hologram image reproducers 110 and the cameras 120 mounted on the support brackets 240 are received in the seat back 10.

The controller 300 of the apparatus according to an exemplary embodiment of the present disclosure may be a processor (e.g., computer, microprocessor, CPU, ASIC, circuitry, logic circuits, etc.). The controller 300 may be implemented by a non-transitory memory storing, e.g., a program(s), software instructions reproducing algorithms, etc., which, when executed, controls operations of various apparatuses described above, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

As described above, the hologram switch system according to an exemplary embodiment of the present disclosure may project hologram switch images in front of the passenger sitting on the seat and allow the passenger to perform selection and operation in the projected hologram switch images through the position and motion of the passenger's hand, so that the passenger may intuitively approach and easily operate the switch images for adjusting the seat and thereby easily operate various seat moving apparatuses and seat air-conditioning apparatuses.

Further, the hologram switch system according to an exemplary embodiment of the present disclosure may omit conventional manually operated switches for adjusting movement of a seat and adjusting air-conditioning of the seat, thereby allowing the seat to be manufactured with a more compact structure and improving space utilization of the seat.

As is apparent from the above description, a hologram switch system of a seat for vehicles according to an exemplary embodiment of the present disclosure may provide the following effects.

First, the hologram switch system according to an exemplary embodiment of the present disclosure may project hologram switch images in front of a passenger sitting on the seat and allow the passenger to perform selection and operation in the projected hologram switch images through the position and motion of a passenger's hand, so that the passenger may intuitively approach and easily operate the switch images for adjusting the seat and thereby easily operate various seat moving apparatuses and seat air-conditioning apparatuses.

Second, the hologram switch system according to an exemplary embodiment of the present disclosure may exclude conventional switches related to seat adjustment, installed on the side surfaces of a seat cushion or armrests, thereby allowing the seat to be manufactured with a more compact structure and improving space utilization of the seat.

Third, the hologram switch system according to an exemplary embodiment of the present disclosure may omit manually operated switches for adjusting seat movement and adjusting seat air-conditioning from autonomous vehicles which will be launched in the future, and provide a hologram switch which is intuitively accessible and easily operable to users.

The present disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A hologram switch system of a seat for vehicles, the hologram switch system comprising:
    one or more hologram image projectors mounted on an upper end of a seat back so as to be received therein and withdrawn therefrom, and configured to generate hologram images for adjusting the seat in front of a user;
    one or more cameras mounted on the upper end of the seat back so as to be received therein and withdrawn therefrom, and configured to recognize a position and motion of a user's hand with respect to the hologram images for adjusting the seat, generated in front of the user, as a seat adjustment switching signal;

an input device configured to input an operation start signal of the one or more hologram image projectors and the one or more cameras; and a controller configured to apply an operation signal to the one or more hologram image projectors and the cameras in response to the operation start signal input through the input device, and to apply a drive control signal to at least one of seat moving apparatuses or seat air-conditioning apparatuses corresponding to the seat adjustment switching signal from the one or more cameras, wherein the one or more hologram image projectors comprise a first hologram image projector mounted on an upper left end of the seat back so as to be received therein and withdrawn therefrom and configured to generate a hologram image for adjusting movement of the seat, and a second hologram image projector mounted on an upper right end of the seat back so as to be received therein and withdrawn therefrom and configured to generate a hologram image for adjusting air-conditioning of the seat.

2. The hologram switch system of claim 1, wherein each of the one or more hologram image projectors and a corresponding one of the one or more cameras are defined as one hologram module, and hologram modules are respectively mounted on elevating apparatuses mounted in the seat back so as to be received therein and withdrawn therefrom.

3. The hologram switch system of claim 1, wherein the hologram image for adjusting movement of the seat is generated by combining respective arrow switch marks for operating a seat forward and backward position adjustment apparatus, a seat back reclining apparatus, a seat cushion tilting apparatus, a seat height adjustment apparatus, a seat cushion extension apparatus, a lumbar support apparatus, a shoulder adjustment apparatus, and a headrest position adjustment apparatus with a seat image.

4. The hologram switch system of claim 1, wherein the hologram image for adjusting air-conditioning of the seat is generated by combining a first block mark for adjusting a level of a ventilation apparatus and a second block mark for adjusting a level of a heating wire apparatus, the first and second block marks appearing in different colors.

5. The hologram switch system of claim 2, wherein each of the elevating apparatuses comprises:

a motor mounted at a designated position of a seat back frame of the seat back and configured to be driven by a control signal from the controller;

a lead screw connected to a rotating shaft of the motor;

an elevating bracket coupled to the lead screw and configured to be raiseable and lowerable; and a support bracket having a front surface portion on which a respective hologram image projector and a respective camera are fixedly mounted and a rear surface portion coupled to the elevating bracket.

6. The hologram switch system of claim 5, wherein the rear surface portion of the support bracket is coupled to the elevating bracket by a ball joint configured to adjust an angle of the elevating bracket in upward and downward directions and in leftward and rightward directions.

7. The hologram switch system of claim 6, wherein each of the elevating apparatuses further comprises a cover configured to cover an opening defined in the seat back, the cover being disposed above the respective camera.

8. The hologram switch system of claim 1, wherein the input device comprises a voice recognizer configured to recognize a user's voice command and to transmit the operation start signal to the controller.

9. The hologram switch system of claim 1, wherein the input device comprises a smart phone configured to transmit the operation start signal to the controller.

10. The hologram switch system of claim 1, wherein each of the one or more cameras comprises a wide angle camera configured to magnify a range of sensing the position and motion of the user's hand.

* * * * *